Feb. 1, 1966  R. G. LAHR  3,232,005
VEHICLE DRIVING AND STEERING DEVICE
Filed Jan. 19, 1962  6 Sheets-Sheet 3

INVENTOR.
ROBERT G. LAHR
BY
ATTORNEY

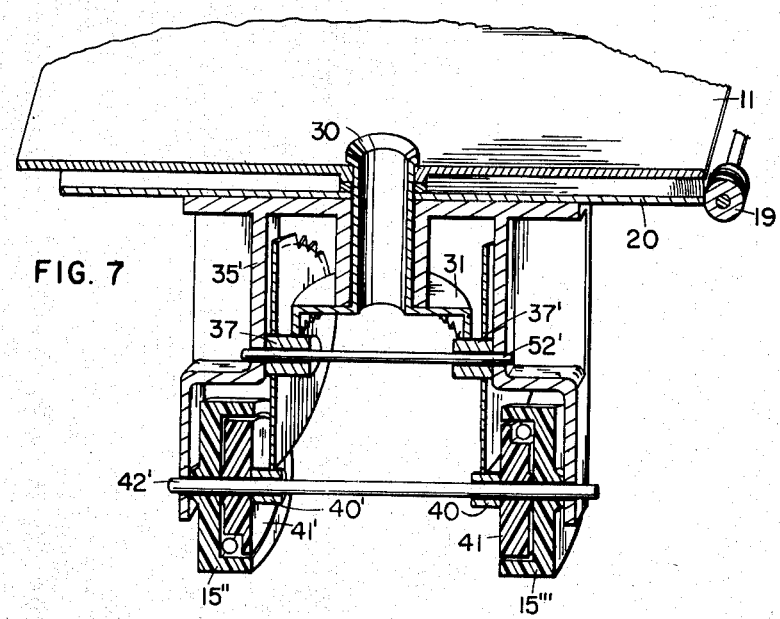
FIG. 7
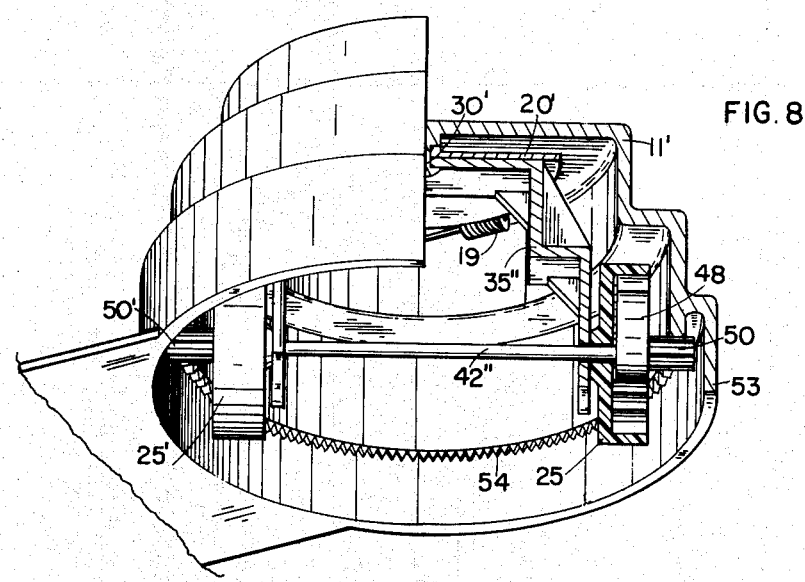
FIG. 8
INVENTOR.
ROBERT G. LAHR
BY
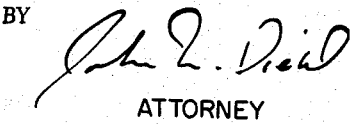
ATTORNEY

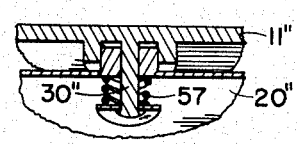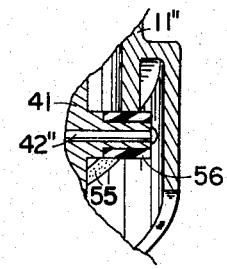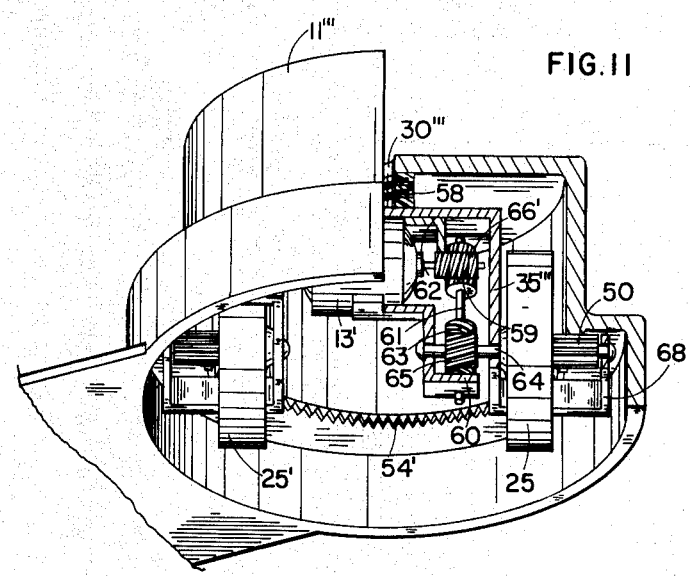

Feb. 1, 1966   R. G. LAHR   3,232,005
VEHICLE DRIVING AND STEERING DEVICE
Filed Jan. 19, 1962   6 Sheets-Sheet 6

INVENTOR.
ROBERT G. LAHR
BY
ATTORNEY

United States Patent Office 3,232,005
Patented Feb. 1, 1966

3,232,005
VEHICLE DRIVING AND STEERING DEVICE
Robert G. Lahr, P.O. Box 385, Rte. 1, Hartland, Wis.
Filed Jan. 19, 1962, Ser. No. 167,376
8 Claims. (Cl. 46—244)

This device relates to a toy vehicle and drive mechanism, and more particularly to a toy vehicle wherein electric motor propulsion is coupled to vehicle steering so that movement of the wheel suspension mechanism about a steering axis provides rotation of the drive wheels to set the vehicle in motion.

The mechanism of this invention is described in relation to toy cars, but is not restricted to use with toys. The mechanism may be used in any application where rotation of an element about one axis is a fixed function of rotation of the element about another axis. In an electric powered toy vehicle, a combined motive power and constant steering drive arrangement provides for vehicle operation such that vehicle steering must be frequently corrected to enable the vehicle to travel in an approximately straight line. A degree of skill is necessary for operating the vehicle, and therefore the toy can be enjoyed by children and adults alike.

It is an object of this invention to provide a motive propulsion and steering mechanism for a vehicle.

It is another object of this invention to provide motive propulsion to the drive wheel of a vehicle by movement of the wheel about a steering axis.

It is another object of this invention to provide for remote control of motive power and steering apparatus in a toy vehicle.

It is another object of this invention to provide a propulsion system for a vehicle wherein power is transmitted to driving wheel means through one of a pair of reversely mounted over-running clutches.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

FIGURE 7 is a cross-sectional perspective view of another embodiment of a steering and propulsion apparatus of this invention;

FIGURE 8 is a cross-sectional perspective view of another embodiment of a steering and propulsion apparatus of this invention;

FIGURE 9 is a cross-sectional perspective view of a modification of a portion of the device of FIGURE 8;

FIGURE 10 is a cross-sectional perspective view of another modification of the device of FIGURE 8;

FIGURE 11 is a cross-sectional perspective view of another embodiment of a steering and propulsion apparatus of this invention;

Figure 1:
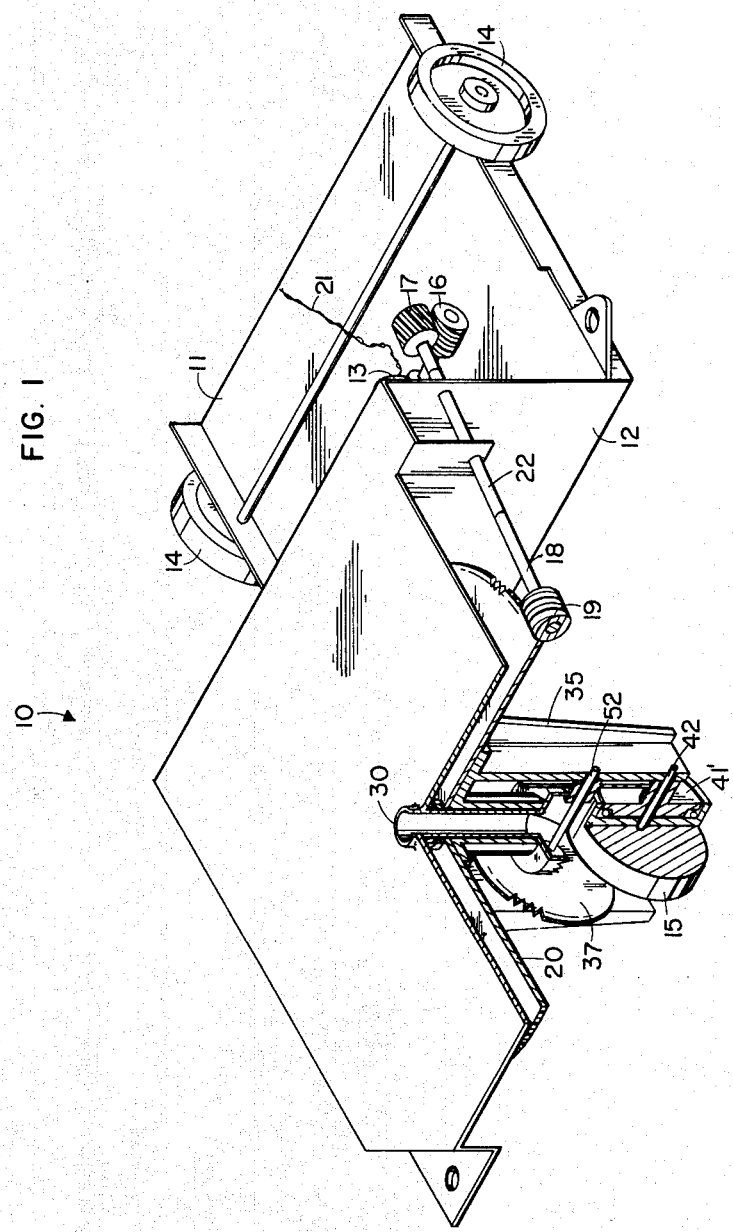
FIGURE 1 is a perspective view in partial section of a toy vehicle of this invention.
Figure 2:
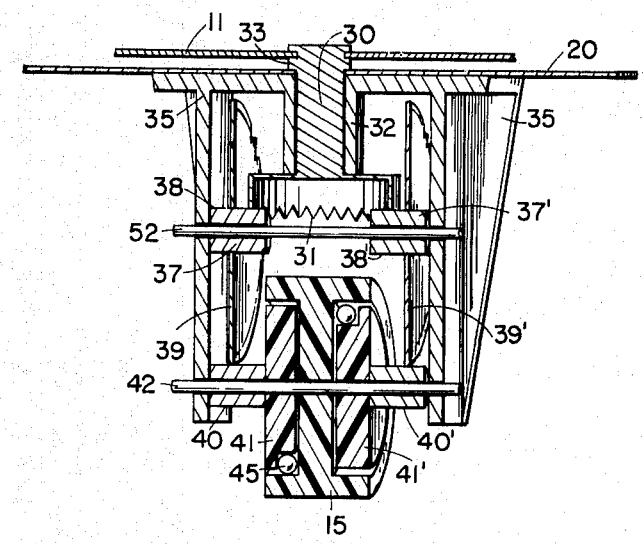
FIGURE 2 is a cross-sectional perspective view of the steering and propulsion apparatus of the vehicle of FIGURE 1.
Figure 3:
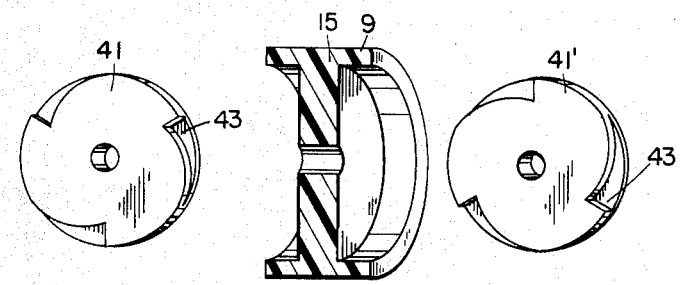
FIGURE 3 is an exploded perspective view of the drive wheel of the device shown in FIGURES 1 and 2.

Referring now to FIGURES 1, 2 and 3, toy 10 comprises a three wheeled vehicle with frame 11 configured with vertical wall portion 12. Drive motor 13 may be mounted on wall portion 12 of frame 11. Rear wheels 14 are non-driven ground wheels mounted by an axle on frame 11 while wheel 15 is a steerable driving wheel. The shaft of motor 13 may be provided with worm 16 affixed thereto. Worm 16 may be meshed with gear 17 on shaft 18, and shaft 18 may be mounted by sleeve bearing 22 which is configured to be thrust resisting. Worm 19 may be fixed on the opposite end of shaft 18 and may be operably meshed with steering gear 20. Motor 13 or any other suitable motor may in this manner, or any other suitable manner, cause gear 20 to rotate.

Electric energy is delivered to motor 13 from flexible electric leads 21 or any other suitable means to enable the vehicle to operate by trailing a cord or by operating from an overhead trolley or from a contact shoe traveling in contact with a conductive floor or from any suitable combination of these means.

In FIGURES 2 and 3 the steerable drive means of vehicle 10 is shown in greater detail than in FIGURE 1. Frame 11, post 30 and crown gear 31 are integrally affixed, with steering gear 20 being rotatively mounted on post 30 by means of wide flanged hub 32. Hub 32 provides a sleeve bearing between the gear 20 and post 30 and crown 33 at the upper extremity of post 30 provides a thrust bearing between gear 20 and post 30. Fork 35 is attached to steering gear 20 by suitable means such as by bolts (not shown) and enables fork 35 and steering gear 20 to rotate integrally. Change gears 37 and 37' comprising two fixedly attached spur gears are journaled on shaft 52. Shaft 52 is mounted in fork 35 as shown. Innermost gear portions 38 and 38' of change gears 37 and 37', respectively, are operably meshed with crown gear 31. Upon rotation of steering gear 20, fork 35 is rotated about post 30 and change gears 37 and 37' are turned on shaft 52 from relative movement between the fork and the stationary post. As is evident, change gears 37 and 37' rotate in opposite directions on shaft 52 from movement about post 30. Outermost gear portions 39 and 39' of change gears 37 and 37' respectively, are operably meshed with clutch pinions 40 and 40'. Clutch pinions 40 and 40' are disposed integrally with inner members 41 and 41' respectively of the over-running clutches shown. The representation of wheel and clutch elements in FIGURE 3, and also of an alternative embodiment thereof in FIGURE 5, portray the inner clutch members 41 and 41' of FIGURE 3, and 48 and 48' of FIGURE 5, rotated 90° to the left and 90° to the right, respectively, of wheel elements 15 and 15' in the respective figures. The several elements of each of the figures are mounted in axial alignment on an axle as shown in FIGURE 2. The clutches are disposed to drive wheel 15 through frictional contact with the inner surface of flange portion 9 of the wheel. Wheel 15 is journaled on axle 42 together with pinions 40 and 40' and inner clutch members 41 and 41'. The axle is operably mounted by fork 35. Pinions 40 and 40' are meshed with outer portions 39 and 39' of change gears 37 and 37', respectively, so that upon rotating steering gear 20, fork 35 turns about stationary gear 31 and rotates change gears 37 and 37', pinions 40 and 40', which are meshed with the change gears, and clutch members 41 and 41' which are integral with pinions 40 and 40'. Clutch members 41 and 41' rotate in opposite directions as do change gears 37 and 37' and pinions 40 and 40' upon rotation of steering gear 20.

Clutch members 41 and 41' operably drive wheel 15 only when they are of laterally reversed construction; i.e., when one clutch member provides clockwise engagement and counterclockwise over-run of wheel 15 and the other clutch member provides counter-clockwise engagement and clockwise over-run of wheel 15, the assumed frames of reference being distinct and relative to opposite faces of wheel 15. Each of clutch members 41 and 41' engage and rotate drive wheel 15 in one and the same direction. When fork 35 is rotated about post 30, one of clutch members 41 or 41' operably engages drive wheel 15 and drives it while the other clutch over-runs it. Upon opposite rotation of fork 35, the other of the clutches engages wheel 15 and continues to drive the wheel in the same direction of rotation while the first clutch over-runs the wheel. Therefore, drive wheel 15 can only be rotated in one direction despite change in the direction of steering. Whenever worm 19 is actuated, steering gear 20 and fork 35 are rotated and wheel 15 is driven. Under no other circumstances can wheel 15 be driven. At all times during which propulsion is provided to the vehicle, wheel 15 is simultaneously undergoing steering rotation. Wheel 15 cannot be reversed in rotation about axle 42 although the axle can be turned about its steering axis to provide rearward vehicle motion.

In FIGURE 3 is shown one embodiment of an over-running clutch comprising wedge shaped openings 43 between flange 9 of wheel 15 and inner clutch member 41. Metal balls 45 are disposed in openings 43 and frictionally engage the two members in a selected direction of rotation. Such a construction of an over-running clutch is conventional and alone comprises no part of this invention.

Figure 4:
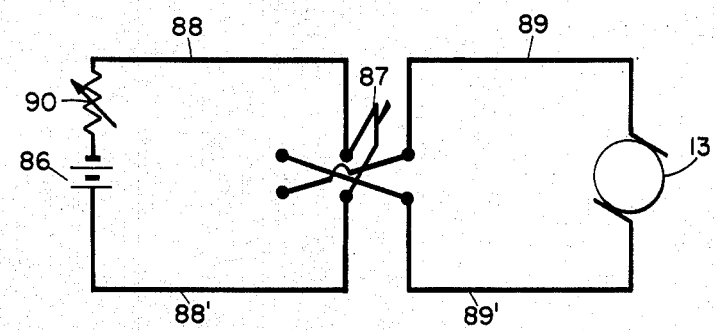
FIGURE 4 is a schematic circuit diagram incorporating a switch for controlling operation of the vehicle of this invention.

In FIGURE 4 is shown a circuit diagram for vehicle 10 wherein battery 86 is connected to double-throw, double-pole switch 87 by leads 88, 88'. By throwing switch 87 from one closed position to the other, the rotation of D.C. motor 13 is reversed. The switch means for controlling motor operation together with variable resistance 90 for controlling motor speed provides complete control for the vehicle. Variable resistance 90 may be eliminated from the circuit if desired. If A.C. power is used, then resistance 90 is not used, but a reactance element such as an inductance coil can be substituted into the circuit of a wound rotor motor. However, it is preferred to use a D.C. motor.

Figure 5:
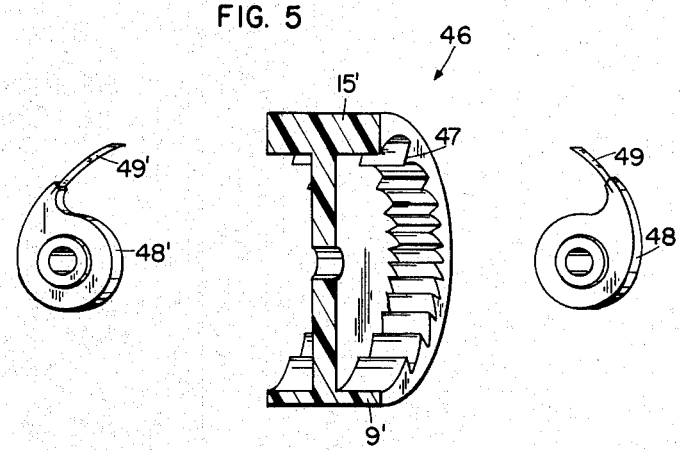
FIGURE 5 is an exploded cross-sectional perspective view of an embodiment of an over-running clutch.
Figure 6:
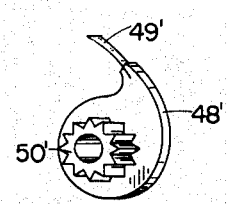
FIGURE 6 is a perspective view of the opposite side of a portion of the clutch device shown in FIGURE 5.

In FIGURES 5 and 6 is shown another embodiment of an over-running clutch which can be used to drive a wheel similar to wheel 15 of FIGURES 2 and 3. In FIGURE 5 the clutch 46 is shown in exploded view with the pawl and hub elements of the clutch rotated 90° to wheel 15' for purposes of illustration. In FIGURE 6 the opposite side of pawl 49' and hub 48' is shown disclosing integral pinion 50'. Pawls 49 and 49' contact internal ratchet face 47 on wheel flange 9' of wheel 15'. Clutch hubs 48 and 48' are mounted on shaft 42 (FIGURE 2) and carry resilient spring pawls 49 and 49' which engage internal ratchet face 47 of wheel flange 9' in operable manner.

One of pawls 49 and 49' engages face 47 in one direction of rotation while the other pawl overruns. However, the over-running pawl engages ratchet face 47 in the opposite direction of rotation, while the first engaged pawl then over-runs. A clutch of such construction is conventional and, in itself, comprises no part of this invention.

It will be apparent from the figures that when a reversible electric motor is provided together with an operable switch control, that the drive wheel of the vehicle can be steered in either right or left direction by reversing the motor. If the motor is not reversed periodically then wheel 15 is steered in a complete circle at a constant rate. The speed of vehicle 10 can be controlled by control of voltage to motor 13 if direct current is used, as is preferred, or by control of either frequency or rotor reactance if alternating current is used. Any such motor may be provided as desired, the controls for such motors being conventional in the art.

In FIGURE 7 there is shown another embodiment of the invention wherein a steering axle and two drive wheels of a different embodiment of a vehicle of this invention are shown. Post 30 is integral with stationary gear 31 and is fixed to frame 11. Fork 35' provides mountings for axle 42' which carries drive wheels 15" and 15"' and clutch members 41 and 41'. Pinions 40 and 40' are integral with clutch members 41 and 41', respectively. Change gears 37 and 37' are journaled on shaft 52' and are meshed with stationary gear 31 in the manner of the embodiment shown in FIGURE 2. The operation of the device of FIGURE 7 is similar to that of the device of FIGURE 2 in the respect that fork 35' turns integrally with steering gear 20 and causes relative movement among change gears 37 and 37' and stationary gear 31. The relative movement between the change gears and the stationary gear rotates change gears 37, 37' in opposite directions on shaft 52' thereby causing opposite rotation of pinions 40 and 40' and clutch members 41 and 41' on axle 42'. Drive wheels 15" and 15"' are not driven simultaneously by their separate clutches because the directions of engagement and over-run of the two drive wheels are similar, and the directions of rotation of clutch members 41 and 41' are opposite at any one time. Only one of the two clutch members 41 and 41' engages a drive wheel at one time. Thus, if drive motor operated worm 19 rotates to turn steering gear 20 counter-clockwise as viewed from the top of the vehicle, then fork 35' will be similarly rotated thereby causing change gears 37 and 37' to mutually counter-rotate on shaft 52' and to drive pinions 40 and 40', and associated clutch members 41 and 41', in opposite directions. The rotation of one clutch member will be such as to drive its associated wheel while the rotation of the other clutch member will be such as to over-run its associated wheel. The selection of engaged and disengaged clutch members is immaterial since the non-selected condition will be achieved when steering gear 20 is rotated 180°.

In FIGURE 8 is shown a modification of the device of FIGURE 7 wherein frame 11' shrouds the driving and steering mechanism and provides crown gear 54, integral with the frame, adjacent clutch pinions 50 and 50'. Post 30' is affixed to frame 11' with steering gear 20' journaled thereon and operably meshed with drive worm 19. Gear 20' is driven by worm 19 in the manner heretofore described. Fork 35" is integral with gear 20' and turns therewith. Drive wheel axle 42" is carried by fork 35". Wheels 25 and 25' are mounted on axle 42" and are driven by clutch members 48' (not shown) and 48. The clutches are over-running clutches of a type heretofore described. Pinions 50 and 50' are integral with clutch members 48 and 48' respectively, and are meshed with crown gear 54. Upon rotation of steering gear 20' by worm 19, fork 35" is rotated thereby causing pinions 50 and 50' to rotate by being displaced relative to stationary crown gear 54. Pinions 50 and 50' drive clutch members 48 and 48' (not shown) respectively, and cause drive wheels 25 and 25' to rotate. The clutches are of lateraly reversed configuration so that when one drive wheel is engaged by its accompanying clutch, the other drive wheel is idling with its accompanying clutch overrunning the drive wheel. The device of FIGURE 8 is a simplified mechanism with fewer gears than those embodiments shown heretofore. The wheel which is acting as the driving wheel in FIGURE 8 will be the wheel describing the smaller radius of turn, that is, the innermost wheel in the turn circle. The turning radius of the vehicle of FIGURE 8 will be greater and the path of the vehicle different from that of the vehicles of FIGURES 1–7 when similar gear ratios are used. It is to be understood, of course, that the vehicle is constantly turning so that a frame of reference describing a wheel with respect to direction of turn is applicable at all times. It will be noted that the embodiments of the invention shown in FIGURES 1–7 provide as the driven wheel the outermost wheel of the vehicle with respect to the turn circle, the difference between the embodiment of FIGURE 8 and the embodiments above described being that cluster gears are eliminated in the drive train of the device of FIGURE 8.

In FIGURES 9 and 10 are shown two modifications of the embodiment of the invention shown in FIGURE 8. Crown gear 54 and pinions 50 and 50' of FIGURE 8 are replaced by friction ring 55 and friction rolls 56 and 56' respectively of FIGURE 9. To provide compression between the frictional components compression spring 57 is provided on post 30" in FIGURE 10. The spring embodiment of FIGURE 10 may be used with any embodiment of the invention but is especially suitable for use in the modified embodiment of FIGURE 9. Operable low friction bearings or anti-friction bearings such as ball bearings or the like may be provided on post 30" to minimize frictional resistance to turning of steering gear 20" by worm 19 (not shown). The operation of the embodiments of FIGURES 9 and 10 is similar to that of FIGURE 8.

In FIGURE 11 is shown a modification of the embodiment of FIGURE 8 wherein drive motor 13' is mounted on fork 35''' to provide an integral self-contained steering and propulsion unit. Post 30''' is fixedly attached to frame 11'''. Motor 13' is fixedly mounted on fork 35''' and is energized through slip rings 58 in conjunction with self-contained batteries in the vehicle or by a trailing cord or trolley (not shown). Slip rings 58 may be arranged in any operable manner to energize reversible motor 13'; such slip ring arrangements are well known in the art and comprise no part of this invention. Output shaft worm 59 on motor 13' is meshed with worm gear 66'. Worm gear 66' drives shaft 61 and worm 63 which is affixed to the shaft. Worm gear 65, fixed on axle 64, is meshed with worm 63. Pinion 50 is also fixed on axle 64 and is meshed with crown gear 54'. Crown gear 54' is integral with frame 11''' of the vehicle. The clutch member associated with wheel 25 is journaled on axle 64 and rotates integrally with pinion 50. Reversible operation of motor 13' causes axle 64 to rotate in either direction thereby driving fork 35''' about a vertical axis in either a counterclockwise or clockwise direction. The relative movement between axle 64 and frame 11''' displaces pinion 50 on crown gear 54' thereby rotating pinion 50 which engages or over-runs wheel 25 depending on the direction of rotation.

In one direction of rotation wheel 25 will be engaged while in the other direction of rotation the wheel will over-run by the clutch. Wheel 25' operates similarly with its associated clutch being similar to that of the embodiment of FIGURE 8.

The above described embodiments of the invention incorporate several drive train arrangements which provide motive power to ground wheels of a vehicle through laterally reversed over-running clutches. The above embodiments are illustrative of such arrangements only and it will be apparent to a person skilled in the art that other embodiments and drive arrangements may be provided. It is within the scope of this invention to provide a combined drive and steering arrangement comprising laterally reversed over-running clutches, on one or more wheels on one or more axles.

Figure 12:
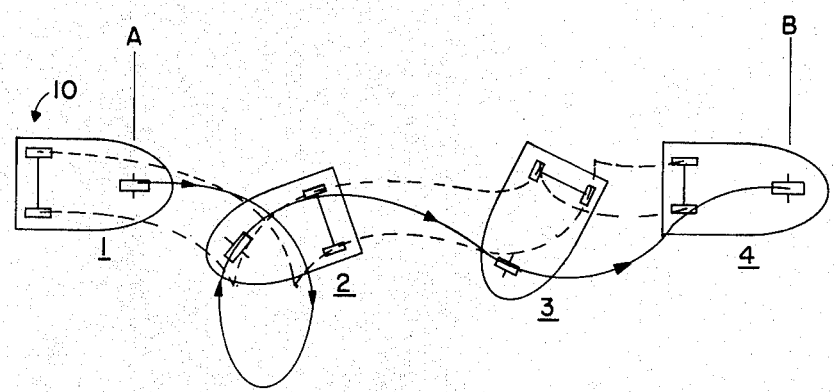
FIGURE 12 is a schematic plan view of a path traveled by the vehicle of FIGURE 1.
Figure 13:
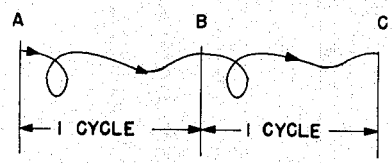
FIGURE 13 is an extended plan view of the path shown in FIGURE 12.
Figure 14:
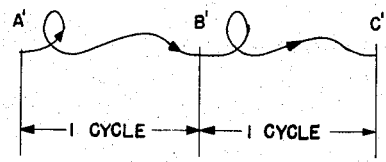
FIGURE 14 is a schematic plan view of the path traveled by the vehicle of FIGURE 1, when the drive motor is reversed in rotation.
Figure 15:
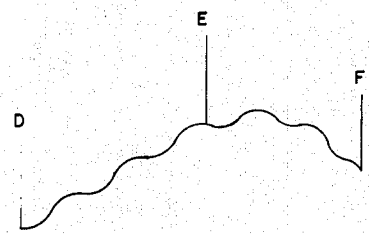
FIGURE 15 is a schematic plan view of a path traveled by the vehicle of FIGURE 1 when the drive motor is intermittently reversed.

In FIGURES 12, 13, 14 and 15 are shown schematic diagrams of characteristic paths traversed by vehicle 10 of FIGURE 1 when drive motor 13 (FIGURE 1) is operated steadily in one direction of rotation to turn vehicle 10 to the right (FIGURES 12 and 13) and when operated in the other direction to turn vehicle 10 to the left (FIGURE 14) or when intermittently reversed to cause vehicle 10 to traverse a course approximating a straight line and a curve (FIGURE 15). In FIGURE 12 vehicle 10 is shown in four different positions numbered 1–4 through which it successively passes in traveling from A to B. The distance between A and B is determined by the net distance traversed by the vehicle during one full revolution of wheel 15 (FIGURE 1) on its steering axis through 360°. The broken line representation indicates the path of the rear wheels of the vehicle in traversing the path from A to B while the solid line indicates the path of the front wheel. As will be apparent the vehicle travels with a rearward component through one-half of the distance.

In FIGURE 13 is shown a front wheel path similar to that of FIGURE 12 extending from A through B to C. It is apparent that the path of travel shown in FIGURE 12 is cyclic, and repetitive, each cycle A to B and B to C corresponding to one full revolution of the front wheel of the vehicle about its steering axis.

In FIGURE 14 is shown a similar diagram of vehicle 10 of FIGURE 1 operated with the drive motor turning in reversed direction. The path from A' to B' and B' to C' is symmetrical with that of FIGURE 12 and similarly constitutes two full revolutions of the wheel about its steering axis describing repetitive cycles A' to B' and B' to C'.

In FIGURE 15 the path shown between D and E is that of front wheel 15 of vehicle 10 (FIGURE 1) when motor 13 is intermittently reversed for equal dwell times thereby causing the vehicle to intermittently change its direction of turn while wheel 15 is propelled in one direction of rotation. Controlled turning is subsequently accomplished between E and F by intermittent reversal of the motor for unequal times with the dwell time in a right-hand steering direction exceeding that of the left-hand direction, with the result that the vehicle traverses a curve from E to F.

While certain modifications and embodiments of the invention have been described, it is of course to be understood that there are a great number of variations which will suggest themselves to anyone familiar with the subject matter thereof and it is to be distinctly understood that this invention should not be limited except by such limitations as are clearly imposed in the appended claims.

I claim:
1. A toy vehicle comprising in combination a frame, a reversible electric motor, a plurality of ground wheels at least one of said wheels being a drive wheel means for said vehicle, a fork mounting said drive wheel means, said fork being steerable about a substantially vertical axis, means for constantly driving said fork about said axis by said motor, a power transmission component fixedly attached to said frame, a pair of rotatable power transmission means operably engaged with each of said power transmission component and said fork to undergo rotation fro mdifferential motion therebetween, an over-running clutch operably coupled to each said rotatable means for propelling said drive wheel means, said clutches being disposed coaxially with said drive wheel means and disposed to over-run in opposite directions, rotation of said clutches in either direction causing said wheel means to rotate in one direction only.

2. The toy vehicle of claim 1 wherein said motor is mounted on said frame and said driving means comprises a power transmission component fixedly attached to said fork.

3. The toy vehicle of claim 1 wherein said motor is fixedly mounted on said fork and said driving means comprises a power transmission component rotatively mounted on said fork and rotatable therewith.

4. The toy vehicle of claim 1 wherein said power transmission component encircles said fork.

5. The toy vehicle of claim 1 wherein said power transmission component and said rotatable means are disposed within the framework of said fork.

6. The toy vehicle of claim 1 wherein said power transmission means comprise frictional means.

7. The toy vehicle of claim 6 wherein said frictional means comprises gears.

8. The toy vehicle of claim 6 wherein said frictional means comprises track and roller means.

References Cited by the Examiner
UNITED STATES PATENTS

| | | | |
|---|---|---|---|
| 2,519,472 | 8/1950 | Howard | 46—210 |
| 2,638,712 | 5/1953 | Jackson | 46—210 |
| 2,775,848 | 1/1957 | Isaacson | 46—244 |
| 2,961,797 | 11/1960 | Bananno | 46—244 |
| 2,974,441 | 3/1961 | Denner | 46—244 |

DELBERT B. LOWE, *Primary Examiner.*

JAMES W. LOVE, RICHARD C. PINKHAM,
*Examiners.*